United States Patent
Branton et al.

(10) Patent No.: US 12,367,199 B2
(45) Date of Patent: Jul. 22, 2025

(54) ENDPOINT SCAN AND PROFILE GENERATION

(71) Applicant: Ivanti, Inc., South Jordan, UT (US)

(72) Inventors: Paul Keith Branton, Rochdale (GB); Jens Miltner, Neunkirchen am Brand (DE)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 18/181,847

(22) Filed: Mar. 10, 2023

(65) Prior Publication Data

US 2023/0289354 A1 Sep. 14, 2023

Related U.S. Application Data

(60) Provisional application No. 63/318,597, filed on Mar. 10, 2022.

(51) Int. Cl.
*G06F 16/00* (2019.01)
*G06F 16/2457* (2019.01)

(52) U.S. Cl.
CPC .............. *G06F 16/24573* (2019.01)

(58) Field of Classification Search
CPC .................................. G06F 16/24573
USPC ................................ 707/600–899
See application file for complete search history.

(56) References Cited

U.S. PATENT DOCUMENTS 11,093,476 B1 8/2021 Neeman et al.
11,172,050 B1 11/2021 Lavinio
2009/0240727 A1* 9/2009 Sheehan ............. G06F 16/2379
2020/0162503 A1* 5/2020 Shurtleff ............ G06F 11/3013
2021/0400070 A1 12/2021 Ackerman et al.
2023/0090079 A1* 3/2023 Bruno .................. H04L 63/029
717/170
2024/0250965 A1* 7/2024 Glyer .................... H04L 43/12

FOREIGN PATENT DOCUMENTS

WO 2019/156786 A1 8/2019

OTHER PUBLICATIONS

International Search Report and Written Opinion for International Application No. PCT/US2023/064103, dated Jun. 26, 2023, 15 pages.

(Continued)

*Primary Examiner* — Michelle N Owyang

(57) ABSTRACT

A method of profiling an endpoint includes generating a structured request including a set of inquiries, each of which being directed to an endpoint parameter and including a parameter name. The method includes generating a scan message including the set of inquiries and an additional inquiry directed to an additional endpoint parameter. The method includes receiving a single response from the endpoint including raw parameter data responsive to the set of inquiries and the additional inquiry. The method includes storing the raw parameter data in a data lake organized according to extracted metadata. The method includes labeling each data portion using the parameter name and the extracted metadata. The method may include accessing, from the data lake, portions of the raw parameter data responsive to the set of inquiries based on labels associated therewith. The method includes generating a profile report derived from the accessed data.

18 Claims, 13 Drawing Sheets

(56) References Cited

OTHER PUBLICATIONS

International Preliminary Report on Patentability and Written Opinion of the International Searching Authority for International Application No. PCT/US2023/064103, dated Sep. 19, 2024, 10 pages.

* cited by examiner

```
import Cocoa public struct SpotlightMetadata : Decodable {
    public let displayName : String?
    public let displayNameWithExtensions : String?
    public let alternateNames : [String]?
    public let bundleIdentifier : String?

public let logicalSize : Int?
    public let physicalSize : Int?

public let appStoreAdamID : IntOrString?
    public let appStoreCategory : String?
    public let appStoreCategoryType : String?
    public let appStoreHasReceipt : Bool?
    public let appStoreInstallerVersionID : String?

...
    enum mdItemError : Error {
        case noFile
        case noNames
        case noDictionary
```

FIG. 4

```
public enum IntOrString {
        case int(i:Int)
        case string(s:String)}

Extension IntOrString {
        public var stringValue : String {
                switch self {
                        case .int(let i): return "\(i)"
                        case .string(let s): retun s }}}

Extension IntOrString : Decodable {
        public init(from decoder:Decoder) throws {
                let container = try decoder.singleValueContainer()
                if let n =try? container.decode(Int.self) {
                        self = .int(i: n)}
                else {self = .string(s: try container.decode(String.self))}}}
```

FIG. 5

```
enum CodingKeys : String, CodingKey {
   case displayNameWithExtensions = "_kMDItemDisplayNameWithExtensions"
   case alternateNames = "kMDItemAlternateNames"
   case appStoreAdamID = "kMDItemAppStoreAdamID"
   case appStoreCategory = "kMDItemAppStoreCategory"
   case appStoreCategoryType = "kMDItemAppStoreCategoryType"
   case appStoreHasReceipt = "kMDItemAppStoreHasReceipt"
   case appStoreInstallerVersionID = "kMDItemAppStoreInstallerVersionID"
   case appStoreIsAppleSigned = "kMDItemAppStoreIsAppleSigned"
   case appStoreParentalControls = "kMDItemAppStoreParentalControls"
   case appStorePurchaseDate = "kMDItemAppStorePurchaseDate" . . .}}
```

FIG. 7

```
init(bundlePath:String, timeout:TimeInterval = 10.0, usemdls:Bool = false) throws {
   let decoder = PropertyListDecoder()
   if usemdls {
      let args = ["-plist", "-", bundlePath ]
      let result = TaskRunner.runTask("/usr/bin/mdls", args: args, timeout: timeout)
      self = try decoder.decode(SpotlightMetadata.self, from: result.dataOut)
   }
   else { guard let mdItem = MDItemCreate(kCFAllocatorDefault, bundlePath as CFString) else {
         throw mdItemError.noFile
      }
      guard let names = MDItemCopyAttributeNames(mdItem) else {
         throw mdItemError.noNames
      } guard let results = MDItemCopyAttributes(mdItem, names) else {
         throw mdItemError.noDictionary
      } let plist = try PropertyListSerialization.data(fromPropertyList: results, format: .xml, options: 0)
      self = try decoder.decode(SpotlightMetadata.self, from: plist)

}
   if let bundleId = bundleIdentifier, let lastLaunch = lastUsedDate {
      if NSRunningApplication.runningApplications(withBundleIdentifier: bundleId).count > 0 {
         minutesUsed = Int(Date().timeIntervalSince(lastLaunch)/60)
      }
      else {
         minutesUsed = 0
      }
   }

```
┌─────────────────────────────────────────────────────────────┐
│ Device ID = 11AA22BB--33CC-4444-D5555D5555D55               │
│ Hardware ID =11AA22BB--33CC-4444-D5555D5555D55              │
│ Scan Type =Full                                              │
│ Type =SourceBook Pro                                         │
│ Login Name =USERNAME                                         │
│ Device Name =COMP-A00BB0C0D0XD0D                             │
│ Computer Name =CO-A00BB0C0D0XD0D                             │
│ Display Name =COMP-A00BB0C0D0XD0D                            │
│ Last Hardware Scan Date =12124212                            │
│ Device - Owner - FullName =USER NAME                         │
│ Device - Owner - ActiveDirectoryID =001          802         │
└─────────────────────────────────────────────────────────────┘
```

OS - Configuration Profiles - (UUID: 11AA22BB--33CC-4444-D5555D5555D55) - Display Name =Cisco AnyConnect plist
OS - Configuration Profiles - (UUID: 11AA22BB--33CC-4444-D5555D5555D55) - Identifier =mi.opaque.1184572.0
OS - Configuration Profiles - (UUID: 11AA22BB--33CC-4444-D5555D5555D55) - Organization =Company
OS - Configuration Profiles - (UUID: 11AA22BB--33CC-4444-D5555D5555D55) - Verification State =not verified
OS - Configuration Profiles - (UUID: 11AA22BB--33CC-4444-D5555D5555D55) - Version =1
OS - Configuration Profiles - (UUID: 11AA22BB--33CC-4444-D5555D5555D55) - Date of Installation =1627651172

Security - AntiVirus Software - AntiVirus - (Number:0) - Product Name =Source_3 Sensor
Security - AntiVirus Software - AntiVirus - (Number:0) - Product Version =111.01

Manufacturer =Source Computer Inc.

System - Manufacturer =Source Computer Inc.
System - Serial Number =C02FX0X1MD6R
System - Model =Source-Comp Pro
System - Chassis Type =SourceBookPro,1

BIOS - Manufacturer =Source Computer Inc.
BIOS - Boot ROM Version =1515.44.2.0.0 (iBridge: 22.54.5115.0.0,0)
BIOS - Serial Number =C02jfdfkdsjfafn Processor - Type =6-Core Source-4 Core k5
Processor - Speed =2.6 GHz
Processor - Processor Count =1
Processor - Features - Cores per Package =6

Company Management - Local Scheduler - Scheduled Tasks - (Number:1) - IP Address Change Filter =No Company Management - Local Scheduler - Scheduled Tasks - (Number:1) - Command Line =-t -1 "/Library/Application
        Support/Compaly/data/Company%20Default%20SourceOS%Ckldifmdsjfdlakdlksalfjldas"
Company Management - Local Scheduler - Scheduled Tasks - (Number:1) - Executable Path ="/Library/example-path-1"
Company Management - Local Scheduler - Scheduled Tasks - (Number:1) - Start Time =1646045556
Company Management - Local Scheduler - Scheduled Tasks - (Number:2) - IP Address Change Filter =No OS - Drivers and Services - Service - (Name:com.source.mobile.obliteration) - Status =Stopped
OS - Drivers and Services - Service - (Name:com.source.CoreAuthentication.daemon) - Status =Running
OS - Drivers and Services - Service - (Name:com.source-2.anyconnect.vpnagentd) - Status =Running

Company Management - Managed by Management Suite =1
Company Management - Agent Version =Company 2021.1 Service Update 1
Company Management - Client Path =/Library/Application Support/Path-example-2
Company Management - Agent Configuration Name =Default Source Configuration
Company Management - Remote Control - Installed =Yes
Company Management - Remote Control - Version =42
Company Management - Remote Control - Secure =Yes
Company Management - Remote Control - Allow Remote Control =Yes
Company Management - Remote Control - Allow Chat =Yes
Company Management - Remote Control - Allow File Transfer =Yes
Company Management - Remote Control - Allow Remote Execute =Yes
Company Management - Remote Control - Allow Reboot =Yes
Company Management - Remote Control - Allow HTML Access =1
Company Management - Inventory - Scanner - Version =11.0.4.1215
Company Management - Inventory - Scanner - Type =Sourceosx
Company Management - Inventory - Initialization File - Version =3.0
Company Management - Inventory - Initialization File - Revision =1.02
Company Management - Inventory - Initialization File - File Size =51515478456
Company Management - Inventory - Initialization File - File Date =1646026880
Company Management - Inventory - Initialization File - File Path =/Library/Application Support/Path-example-3
Company Management - Common Base Agent 8 - Installed =Yes
Company Management - Common Base Agent 8 - Version =51.0.4.121

Company Management - Source Agent - (Name:ldremotemenu.app) - Version =09.04.2365
Company Management - Source Agent - (Name:vulscan) - Version =09.0.4. 2365
...
Company Management - Source Agent - (Name:ldiscan) - Version =09.0.4. 2365
Company Management - Source Agent - (Name:addhandler) - Version =09.0.4.197
SourceCompany MDM - MDM Server URL =https://mdm-na2.examplecompany.com/c/i/mdm/
mdm?udid=11AA22BB--33CC-4444-D5555D5555D55
SourceCompany MDM - MDM Profile Install Date =1627651138
SourceCompany MDM- MDM Profile UUID =11AA22BB--33CC-4444-D5555D5555D55
SourceCompany MDM - Enrolled via DEP =Yes
SourceCompany MDM - User Authenticated MDM =No
SourceCompany MDM- Enrolled in MDM =Yes Company Management - Trusted Certificates - (Hash:88f555852) - Computer =loc-dindk
Company Management - Trusted Certificates - (Hash:88f555852) - Key =Comp_00221151521
Company Management - Trusted Certificates - (Hash:88f555852) - Organization =Company
Company Management - Trusted Certificates - (Hash:88f555852) - Created =1584629646

Primary Owner =COMP-CO3KDINSMEHD\username
QualifiedLoginName = COMP - CO3KDINSMEHD \ username
FullName =user first name user given name
Domain Name = COMP - CO3KDINSMEHD

FIG. 8B

Memory - Physical - Bytes Total =12545 MB  
Memory - Physical - Bytes Available =23232 MB  
Memory - Slots - Number of Slots =2  
Memory - Slots - Memory Slot - (Number:0) - Socket Designation =BANK 0/ChannelA-DIMM0  
Memory - Slots - Memory Slot - (Number:0) - Manufacturer =SK Hynix  
Memory - Slots - Memory Slot - (Number:0) - Part Number =-  
Memory - Slots - Memory Slot - (Number:0) - Serial Number =-  
Memory - Slots - Memory Slot - (Number:0) - Installed Size =16 GB  
Memory - Slots - Memory Slot - (Number:0) - Current Speed =2667 MHz  
Memory - Slots - Memory Slot - (Number:0) - Status =ok  
Memory - Slots - Memory Slot - (Number:0) - Current Type =DDR4  
...  
Memory - Page File - Available =330 MB  
Memory - Page File - Maximum Size =4096 MB  
Memory - Virtual - Bytes Total =232323 MB  
Memory - Virtual - Status =On OS - Name =SourceOS  
OS - Version =11.6.4  
OS - Source Info - Current Build =20G417  
OS - Source Info - Current Version =11.6.4  
OS - Source Info - File Sharing - Sourceintosh Name =CO-CINCUIDCYK3778C78  
OS - Source Info - Selected Printer Name =

Printers - Default Printer =  
Printers - Printer - (Number:0) - Name =10.0.0.80  
...  
Printers - Printer - (Number:5) - Name =RICOHMultiPrinter PCL Environment - Variable - (Name:XPC_SERVICE_NAME) - Value =com.Company.inventorytool.root  
Environment - Variable - (Name:PATH) - Value =/usr/bin:/bin:/usr/sbin:/sbin  
Environment - Variable - (Name:XPC_FLAGS) - Value =0x0

Network - NIC Address =88:66:5a:40:54:54  
Network - TCPIP - Multihoming =No  
Network - TCPIP - Subnet Mask =255.255.255.0  
Network - TCPIP - Address =10.0.1.6  
Network - TCPIP - Default Gateway Address =10.0.1.1  
Network - TCPIP - Host Name =IV-C02FX0X1MD6R  
Network - TCPIP - Bound Adapter - (Number:1) - Physical Address =88:66:5a:40:54:54  
Network - TCPIP - Bound Adapter - (Number:1) - Status =3  
Network - TCPIP - Bound Adapter - (Number:1) - IP Address =10.0.1.6  
Network - TCPIP - Bound Adapter - (Number:1) - DHCP Enabled =Yes  
Network - TCPIP - Bound Adapter - (Number:1) - Default Gateway =10.0.1.1  
Network - TCPIP - Bound Adapter - (Number:1) - Default Gateway SOURCE Address =f0:99:bf:03:55:31  
Network - TCPIP - Bound Adapter - (Number:1) - Subnet Mask =255.255.255.0  
Network - TCPIP - Bound Adapter - (Number:1) - Network ID =10.0.1.0/24  
Network - TCPIP - Bound Adapter - (Number:1) - Description =Wi-Fi  
...

Network - Proxies - Proxy - (Name:FTP) - Enabled =No  
Network - Proxies - Exceptions =*.local;169.254/16

⌠ 220

Ports - USB - Device - (Number:0) - Name =Card Reader  
Ports - USB - Device - (Number:0) - Manufacturer =CalDigit  
...

Mass Storage - Logical Drive - (Drive Letter:0) - Volume Label =Sourceintosh HD - Data  
Mass Storage - Logical Drive - (Drive Letter:0) - File System =APFS  
Mass Storage - Logical Drive - (Drive Letter:0) - Initialization Date =1577865600  
Mass Storage - Logical Drive - (Drive Letter:0) - File Count =4695241  
Mass Storage - Logical Drive - (Drive Letter:0) - Folder Count =1400141  
Mass Storage - Logical Drive - (Drive Letter:0) - Total Storage =953904.1 MB  
Mass Storage - Logical Drive - (Drive Letter:0) - Available Storage =73767.4 MB  
Mass Storage - Logical Drive - (Drive Letter:0) - Block Size =4096  
...

Video - Adapter - (Number:0) - Adapter String =kHW_IntelUHDGraphics630Item  
Video - Adapter - (Number:0) - Manufacturer =Intel  
Video - Adapter - (Number:0) - ChipSet =Intel UHD Graphics 630  
...

Video - Monitors - Monitor - (Number:0) - Model =Color LCD  
Video - Monitors - Monitor - (Number:0) - Vendor ID =610  
Video - Monitors - Monitor - (Number:0) - Manufacturing Week =36  
Video - Monitors - Monitor - (Number:0) - Manufacturing Year =2019

Battery - Cycle Count =9  
Battery - Battery Condition =Good  
Battery - Device Name =nd87mdi93kdi38dj  
Last Software Scan Date =1646045554

_SOFTWARE =  
Software - Drivers and Plug-ins - (Name:ACPI_SMC_PlatformPlugin) - Version = 1.0.0  
OS - Drivers and Services - Kernel Driver - (Name:com.Source.driver.ACPI_SMC_PlatformPlugin) - Status = Stopped  
...  
Software - Drivers and Plug-ins - (Name:watchdog) - Version = 1.0  
OS - Drivers and Services - Kernel Driver - (Name:com.Source.driver.watchdog) - Status = Running Product - (Hash:9EaP8th-hashvlau07) - Definition ID = Finder  
_BeginProdDef  
<Product name="Finder" version="11.5" size="46022806" created="2020-01-01T08:00:00Z" company="Source" timesrun="5" lastrun="2022-02-28T10:08:47Z" minutesused="43" dateadded="2020-01-01T08:00:00Z" productcode="com.Source.finder-11.5" >  
</Product>  
_EndContents _EndContents

FIG. 8D

ENDPOINT SCAN AND PROFILE GENERATION

CROSS-REFERENCE TO RELATED APPLICATION

This application claims priority to and the benefit of U.S. Provisional Application No. 63/318,597, filed Mar. 10, 2022, which is incorporated herein by reference in its entirety.

FIELD

The embodiments described in this disclosure are related to endpoint management. In particular, some embodiments are related to systems and methods for scanning an endpoint and endpoint profile generation.

BACKGROUND

In enterprise and other managed networks, an endpoint refers to a computing device that may be integrated into the network and that is in communication with a management device. The management device may include a server device, for instance, that has visibility to operating parameters and state parameters of the endpoints. Based on information communicated between the management device and the endpoints, the management device may detect issues at the endpoints, deploy solutions to the endpoints, update software on the endpoints, troubleshoot issues at the endpoints, provision roles and security controls to the endpoints, etc. The visibility into the operating parameter and state parameters of the endpoints may be involved in other management operations. For instance, an attempt to identifying a cause of a technical issue on the endpoints or making an evaluation of suitability of a software application may be based on the management device accessing parameters from the endpoint.

In some conventional systems, a request for a particular amount of data may be communicated to the endpoint. The request is generally directed to a specific file or log file. Accordingly, the request is directed to a discrete amount of data that may be accessed at the specific file or log. Thus, to generate an overall view of the endpoint multiple requests, which are configured in multiple ways, are used to generate a profile of the endpoint. These convention processes are time-consuming and resource intensive. Additionally, these conventional operations may be error prone. For instance, as systems and applications change on the endpoints, the requests must be correspondingly updated, or else errors are possible. Accordingly, there is a need to improve endpoint scanning and profile generation.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of the invention, an embodiment may include a method of profiling an endpoint. The method may include generating a structured request directed to an endpoint. The structured request may include a set of inquiries. Each inquiry of the set of inquiries may be directed to an endpoint parameter and may include an anticipated data type and a parameter name. The method may include generating a scan message directed to the endpoint. The scan message may include the set of inquiries and at least one additional inquiry directed to an additional endpoint parameter. The method may include communicating the scan message to the endpoint. The method may include receiving a single response from the endpoint. The single response may include raw parameter data responsive to the set of inquiries and the additional inquiry. The raw parameter data includes multiple data portions having metadata associated with the multiple data portions. The method may include extracting the metadata from the raw parameter data. The method may include storing the raw parameter data in a data lake organized according to the metadata. The method may include labeling each data portion using the parameter name of the structured request and the metadata of the raw parameter data. The method may include accessing from the data lake portions of the raw parameter data responsive to the set of inquiries based on labels associated with each data portion. The method includes generating a profile report of the endpoint derived from the accessed data.

An additional aspect of an embodiment includes a non-transitory computer-readable medium having encoded therein programming code executable by one or more processors to perform or control performance at least a portion of the methods described above.

Yet another aspect of an embodiment includes a computer device. The computer device may include one or more processors and a non-transitory computer-readable medium. The non-transitory computer-readable medium has encoded therein programming code executable by the one or more processors to perform or control performance of one or more of the operations of the methods described above.

A further aspect of an embodiment includes a system configured for automated product management. The system may include a communication network, two or more managed endpoints, and a device. The device may include one or more processors and a non-transitory computer-readable medium. The non-transitory computer-readable medium may have encoded therein programming code executable by one or more processors to perform or control performance of one or more of operations of the methods described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4 depicts some example inquiries that may be implemented in the profile process of FIG. 2;

FIG. 5 depicts an example processing algorithm that may be implemented in the profile process of FIG. 2;

FIG. 6 depicts an example raw parameter data processing algorithm that may be implemented in the profile process of FIG. 2;

FIG. 7 depicts an example mapping operation that may be implemented in the profile process of FIG. 2;

FIGS. 8A-8D depict an example profile report that may be output by the profile process of FIG. 2;

DESCRIPTION OF SOME EXAMPLE EMBODIMENTS

Figure 1:
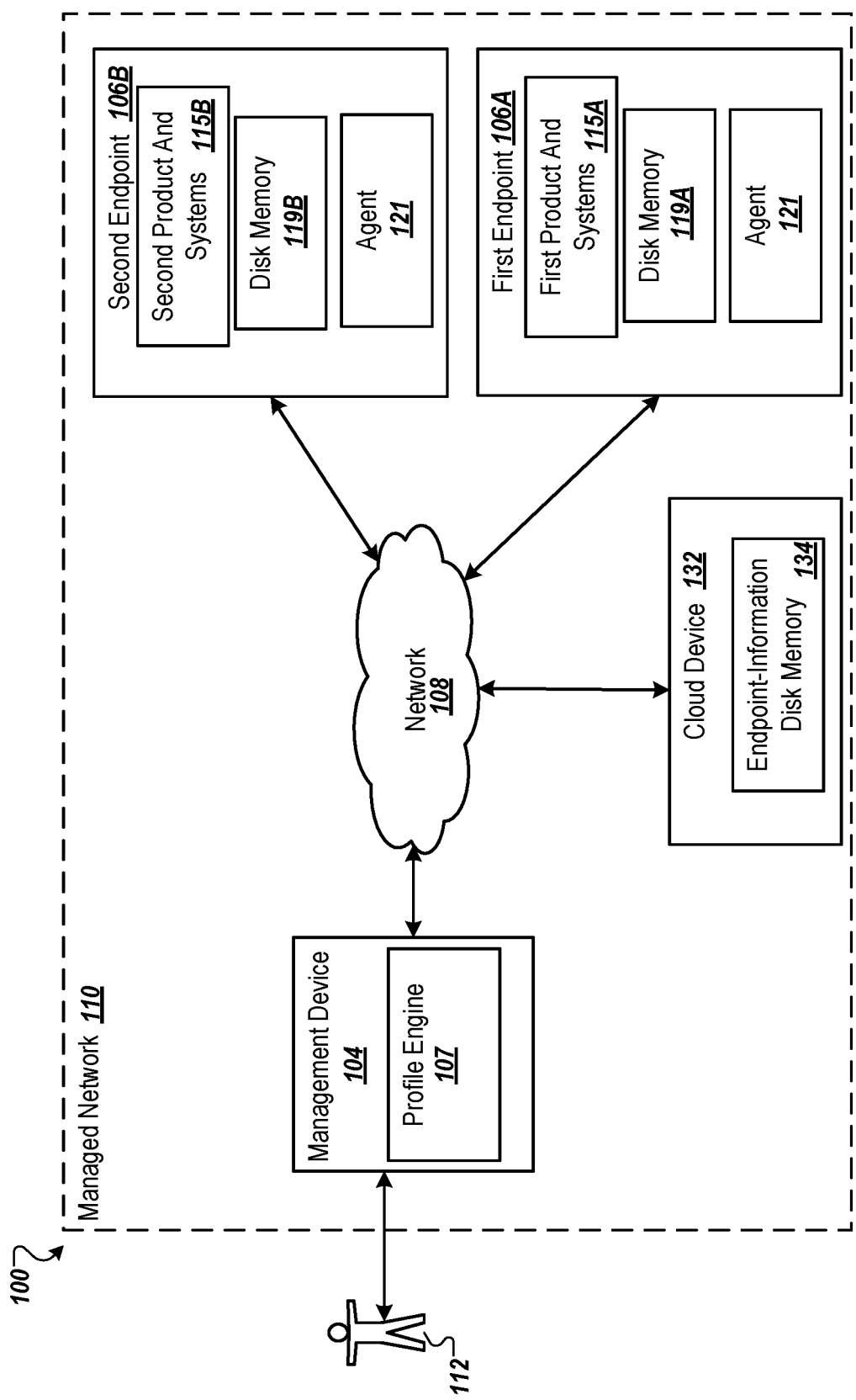
FIG. 1 depicts a block diagram of an example operating environment in which some embodiments described in the present disclosure may be implemented.

The embodiments described in this disclosure are related to endpoint management. In particular, some embodiments are related to systems and methods for scanning an endpoint and endpoint profile generation.

In some conventional endpoint scanning systems, a management device communicates a series or set of inquiries to an endpoint. This set or series of inquiries introduces inefficiencies. For example, the management device might be interested in a first, a second, and a third piece of information from an endpoint. To obtain the first piece of information a first inquiry may be sent to the endpoint. Similarly, to obtain the second piece of information a second inquiry may be sent. However, if the second piece of information is dependent or related to the first piece, then to obtain the second piece, the first piece may be re-accessed to construct the second piece of information. This type of piecewise, repetitive data access introduces inefficiencies. Moreover, in this example, the third piece of information may be stored in a different location from the first and second pieces of information. Accordingly, a third inquiry directed to the third piece of information may be substantially different from the first and second inquiries.

Accordingly, some embodiments described in the present disclosure use a structured request. The structure request may be analogous to an overly inclusive list of inquiries. The inquiries are configured to pre-collect information from an endpoint. The structured request may access more information than necessary for a particular report or scan using a single request or a few (e.g., two or three) requests. Additionally, these and other embodiments may receive raw parameter data in a single response. The raw parameter data may be stored in a simple or general organizational structure such as in a data lake. The report may then organize the raw parameter data to generate a profile report. Advantages over conventional systems include fewer and more efficient requests sent to the endpoint, which reduces time the time of a scan (e.g., from tens of minutes to one or two minutes) as well as reduces computer processing by the endpoint.

Moreover some embodiments include flexible data type inquiries. The flexible data type inquiries are configured to receive two or more data types. Accordingly, the raw parameter data responsive to the flexible data type inquiries may take the form of any of two or more data types. Advantages of the flexible data type inquiries include enabling use with multiple types of endpoints, which may define data in different ways, along with enabling use with one endpoint over a long period of time during which the data type of raw parameter data might change. In both circumstance, use of the flexible data type inquiries might reduce the number of crashes of a scan operation.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

FIG. 1 depicts an example operating environment 100 in which some embodiments may be implemented. The operating environment 100 may include a management device 104 communicatively coupled to one or more endpoints 106A and 106B (generally, endpoints 106) and a cloud device 132. The management device 104 may be configured to perform one or more management operations relative to the endpoints 106. For instance, the management device 104 may ensure the endpoints are up to date, may ensure users of the endpoints 106 have access to applications suitable for a role or function, the management device 104 may provide technical support to the endpoints 106, and the like. In some management operations, the management device 104 may perform a scan of one or both of the endpoints 106 to generate an endpoint profile (hereinafter, "profile").

The profile provides a list of systems and applications on the endpoints 106 as well as information related to those systems and applications. Some examples of the information related to the systems and applications include a date a system was added to the endpoint 106, number of times the system or application has run, size or capacity of the systems and applications, physical addresses of the systems and applications, subnets, gateway addresses, manufacturer, capacity, condition, other attributes or parameters of the systems and applications, or combinations thereof.

Processes for generation of the profile, however, may be time consuming, computing resource intensive, and may cause crashes. For instance, in some conventional systems implementation of a scan of one of the endpoints 106 may involve multiple requests communicated to several memory locations. Accordingly, these conventional operations may take several minutes (e.g., twenty to thirty minutes) to create a profile of a typical workstation computer. Moreover, some profile information may cause a computer system implementing the scan or the scan operation to crash. For instance, when data accessed during a scan is of an unanticipated data type or the data type changes between scans, the scan operation may crash and/or generate processing errors.

The management device 104 of FIG. 1 addresses these and other limitations of conventional endpoint profiling systems. For instance, the management device 104 may include a profile engine 107. The profile engine 107 is configured to access endpoint parameters of the endpoints 106. For instance, the profile engine 107 is configured to the access disk memory location 119A or 119B (generally, disk memory 119 or disk memories 119) of the endpoints 106. The disk memory 119 of the endpoints 106 are locations on the endpoints 106 on which endpoint parameters are accessible. In some embodiments, the disk memory 119 may include or host an application or application database of the endpoints 106 on which the endpoint parameters are accessible. For instance, in Apple® or Mac® endpoints, the profile engine 107 might interface directly or indirectly with Spotlight™, which is a search feature with access to application databases.

The profile engine 107 may implement a scan of the disk memory 119 using a single request or a few requests (e.g., two or three) that is based on a structured set of inquiries. The inquiries may include parameter names, metadata, or properties which indicate characteristics of data and information sought by the inquiries. Data from the endpoints 106 may be collected into a single response, which is returned to the management device 104. The data may be stored in a data pool at least temporarily or another generally raw or minimally organized storage repository. The data may then be processed using the parameter names to organize the data and incorporate it into the profile.

In some embodiments, a single request may be used in the scan and a single response may be communicated. In some embodiments, the single request and the single response may be possible because the single request is directed to the disk memory 119 instead of multiple memory locations on the endpoints 106.

In addition, one or more of the inquiries of the single request may include a data type that is configured to receive data having two or more data types. As used in the present disclosure, the term "data type" refers to a specification of a type of a requested value from the endpoints 106 and mathematical, relational, logical operations that can be applied to the requested value without causing an error. Some examples of the data type might include Boolean (bool), float (real), character (char), integer (int), string (text), etc.

Receipt of the two or more data types may enable response data to have two or more data types without crashing a scan operation. Moreover, receipt of the two or more data types may enable one request to be used with multiple types of endpoints 106 and/or at multiple times despite changes in data type that may occur between scans. Accordingly, crashes because of mismatched or inconsistent data types may be reduced relative to conventional scan operations.

In the embodiment of FIG. 1, the operating environment 100 may include the endpoints 106, the management device 104, and the cloud device 132 that communicate via a network 108. The network 108 is configured to communicate data and information between the endpoints 106, the cloud device 132, and the management device 104.

The network 108 may include any communication network configured for communication of signals between the components (e.g., 104, 132, and 106) of the operating environment 100. The network 108 may be wired or wireless. The network 108 may have configurations including a star configuration, a token ring configuration, or another suitable configuration. Furthermore, the network 108 may include a local area network (LAN), a wide area network (WAN) (e.g., the Internet), and/or other interconnected data paths across which multiple devices may communicate. In some embodiments, the network 108 may include a peer-to-peer network. The network 108 may also be coupled to or include portions of a telecommunications network that may enable communication of data in a variety of different communication protocols.

In some embodiments, the network 108 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 108 may include data communicated via short messaging service (SMS), multimedia messaging service (MMS), hypertext transfer protocol (HTTP), direct data connection, wireless application protocol (WAP), or any other protocol that may be implemented in the components of the operating environment 100.

The endpoints 106 may include hardware-based computer systems that are configured to communicate with the other components of the operating environment 100 via the network 108. The endpoints 106 may include any computer device that may be managed by the management device 104 and/or have been enrolled in a managed network 110. Generally, the endpoints 106 include devices that are operated by the personnel and systems of an enterprise or store data of the enterprise. The endpoints 106 might include workstations of an enterprise, servers, data storage systems, printers, telephones, internet of things (IOT) devices, smart watches, sensors, automobiles, battery charging devices, scanner devices, etc. The endpoints 106 may also include virtual machines, which may include a portion of a single processing unit or one or more portions of multiple processing units, which may be included in multiple machines. The endpoints 106 may be referred to as managed endpoints when the endpoints 106 are included in the managed network 110.

The endpoints 106 include products and systems 115A and 115B (hereinafter, products 115). The products 115 may include applications, components, systems, drivers, of any kind or type. Some examples of the products 115 may include software applications, enterprise software, operating systems, hardware components, installed printers, memory locations, utilized monitors, ports, plug-ins, services, network communication components, the endpoint 106 itself (or information related thereto), similar computer-related features or components, or combinations thereof. First products 115A on the first endpoint 106A may not be the same as second products 115B on the second endpoint 106B. For instance, the first products 115A may include a first set of software applications. The second products 115B may include a second set of software applications, which includes at least one software application not included in the first set of software applications.

The endpoints 106 may also include the disk memory 119 that is described above. The disk memory 119 may include a portion of non-transitory memory of the endpoints 106. For instance, the disk memory 119 may include a built-in databases of application information. As introduced elsewhere in the present disclosure, the profile engine 107 may interface with a local search feature (e.g., Spotlight®). The inquiries of a structure request may be communicated to the search feature, which has access to endpoint parameters.

On the endpoint 106, information regarding the products 115 may be communicated to the disk memory 119 and stored therein at least temporarily. This communication of information may be ongoing. Accordingly, the information represents a current or substantially current state of the products 115 as well as historical states of the products 115. "Substantially current" may refer to a short, immaterial delay due to communication of signals between the products 115 and the disk memory 119 (e.g., 20 microseconds). The information related to the products 115 may be updated at the disk memory 119 based on operation of the products 115.

The endpoints 106 might also include an agent 121.

In some embodiments, the profile engine 107 may be configured to interface with an agent 121. The agent 121 may be configured to exist on the endpoints 106 to support ongoing management of the endpoints 106. The agent 121 may interface with local applications (e.g., the search feature) at the 121 and may support communication of information back to the management device 104.

The cloud device 132 may be one or more hardware-based computing systems. For instance, the cloud device 132 may be a combination of virtual processors or cores aggregated across servers in a cloud service (e.g., AWS® or Azure®), a single server device, or two or more server devices. The cloud device 132 may be configured to assist in or provide management services to the endpoints 106. As a part of management of the endpoints, the cloud device 132 may collect information from the products 115. For instance, to determine vulnerabilities at the endpoints 106, the cloud device 132 may collect application version information. The information related to the endpoints 106 may be stored at least temporarily at endpoint-information disk memory 134 and may be otherwise used by the cloud device 132.

The endpoint-information disk memory 134 of the cloud device 132 may be substantially similar to the disk memory 119 of the endpoints 106. One or both of these may be examples of memory 912 described with reference to FIG. 9 below.

The management device 104 may include a hardware-based computer system that is configured to communicate with the other components of the operating environment 100 via the network 108. The management device 104 may be associated with an administrator 112. The administrator 112 may be an individual, a set of individuals, or a system that interfaces with the management device 104. In some embodiments, the administrator 112 may be provide input to the management device 104. The input provided by the administrator 112 may form the basis of some computing processes and operations performed by the management device 104. For example, the administrator 112 may provide user input at a user interface associated with the management device 104. The user input may be used to generate structured requests as described elsewhere in the present disclosure.

The management device 104 may include the profile engine 107. The profile engine 107 may be configured to generate profiles of the endpoints 106. In general, the profiles of the endpoints 106 are based on a scan of the disk memory 119 using a request and based on a response. For instance, in some embodiments, the profile engine 107 may be configured to generate a profile of one or both of the endpoints 106. To do so, the profile engine 107 may generate or implement a structured request. The structure request may be generated based on input from the administrator 112, a previously generated structured request, a feature or characteristic of the endpoints 106, or combinations thereof. The structured request may be directed to one or both of the endpoints 106. The structured request may include multiple inquiries, which may each be directed to gathering a particular set of information regarding the endpoint 106 from the disk memory 119, which is referred to herein as endpoint parameters. The inquiries may be configured to over-collect information from the endpoints 106. For instance, the profile engine 107 may be configured to access an endpoint parameter of a particular type of multimedia. Instead of requesting the endpoint parameters directed to the particular type of multimedia, the inquiry may be directed to the endpoint parameter of all types of multimedia. The raw parameter data includes the particular type as well as endpoint parameters that may not be of particular interest.

In some embodiments, one or more of the inquiries may include an anticipated data type and parameter names. The anticipated data type indicates the data type of corresponding response data that is associated with the inquiry. The parameter names correspond to the characteristic of the information sought and associated with corresponding response data.

In some embodiments one or more of the inquiries may include an anticipated data type that is configured to receive two or more data types. In these and other embodiments, the portion of the response data corresponding to these inquiries may be received and converted between data types. For instance, a first inquiry may include an integer-or-string data type. The integer-or-string data type enables a data portion that is responsive to the inquiry to be either an integer data type or a string data type. Responsive to receipt of a string data type, the profile engine 107 may convert the data to an integer or vice versa.

The profile engine 107 may generate a scan message based on the set of inquiries. In some embodiments, the scan message may include the set of inquires along with at least one additional inquiry. The additional inquiry might be directed to an additional endpoint parameter, which is gathered for efficiency of a scan operation.

The profile engine 107 may communicate the scan message to one or both of the endpoints 106. The scan message may be a single request message sent to the endpoint 106. The profile engine 107 may then receive a single response from the endpoint 106. The single response includes raw parameter data responsive to each of the inquiries. For instance, the data may include multiple data portions each corresponding to one of the inquiries. The data portions include a data type.

The profile engine 107 may extract metadata from the raw parameter data and store the raw parameter data in a data lake at least temporarily. The data lake may enable access by the profile engine 107 to further process and organize the data without initially applying processing and structuring operations. The raw parameter data may be organized in the data lake according to the metadata.

The profile engine 107 may label the data portions. For instance, the profile engine 107 may apply labels using to the parameter names of the structured request and/or metadata of the raw parameter data. In some embodiments, the labeling includes correlating one or more of the parameter names to a particular data portion using a mapping table. Additionally or alternatively, the profile engine 107 may generate a dictionary using MDItem functions. The dictionary may then be modified into a plist data blob and use a decoder to obtain data for the labels applied to the data portions. The profile engine 107 may access portions of the raw parameter data responsive to the set of inquiries based on labels associated with the data portions and generate a profile report of the endpoint 106 from the parsed data.

In the embodiment of FIG. 1, the profile engine 107 is implemented in the management device 104, which is separate from the endpoint 106 and the cloud device 132. In some embodiments, the profile engine 107 or some functionality or portion thereof may be implemented at the endpoint 106 or at the cloud device 132. For instance, the profile engine 107 may be included in the cloud device 132 or at one or both of the endpoints 106. Moreover, the management device 104 may be configured to profile itself using the operations described above attributed to the profile engine 107. In these and other embodiments, the profile engine 107 may communicate with a disk memory of the management device 104, which stores information from products 115 on the management device 104.

Additionally or alternatively, in some embodiments, the profile engine 107 may be configured to perform the operations above relative to the endpoint-information disk memory 134 of the cloud device 132. For instance, instead of the requesting information from the endpoint 106, the profile engine 107 may request information from the cloud device 132. Additionally still, in some embodiments, to complete a profile of the endpoint 106, the profile engine 107 may communicate one request message to the endpoint 106 and one to the cloud device 132.

Additionally, in the embodiment of FIG. 1, the endpoints 106 and the management device 104 are included in the managed network. 110. The managed network 110 is implemented to enable management of the endpoints 106 by the management device 104. To implement the managed network 110, the endpoints 106 may be enrolled. After the endpoints 106 are enrolled, ongoing management of the endpoints 106 may be implemented by the management device 104. The ongoing management may include overseeing and dictating at least a part of the operations at the endpoints 106 as described in the present disclosure.

The managed network 110 may be associated with an enterprise, a portion of an enterprise, a government entity, or another entity or set of devices (104, 106, and 132). In some embodiments, the management device 104 may be a single server, a set of servers, a virtual device, or a virtual server in a cloud-base network of servers. In these and other embodiments, the profile engine 107 may be spread over two or more cores, which may be virtualized across multiple physical machines.

The profile engine 107, at least some of the products 115, the agent 121 and components thereof may be implemented using hardware including a processor, a microprocessor (e.g., to perform or control performance of one or more operations), a field-programmable gate array (FPGA), or an application-specific integrated circuit (ASIC). In some other instances, profile engine 107, at least some of the products 115, the agent 121 and components thereof may be implemented using a combination of hardware and software. Implementation in software may include rapid activation and deactivation of one or more transistors or transistor elements such as may be included in hardware of a computing system (e.g., the endpoints 106 or the management device 104 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more managed networks 110, one or more management devices 104, one or more endpoints 106, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 2:
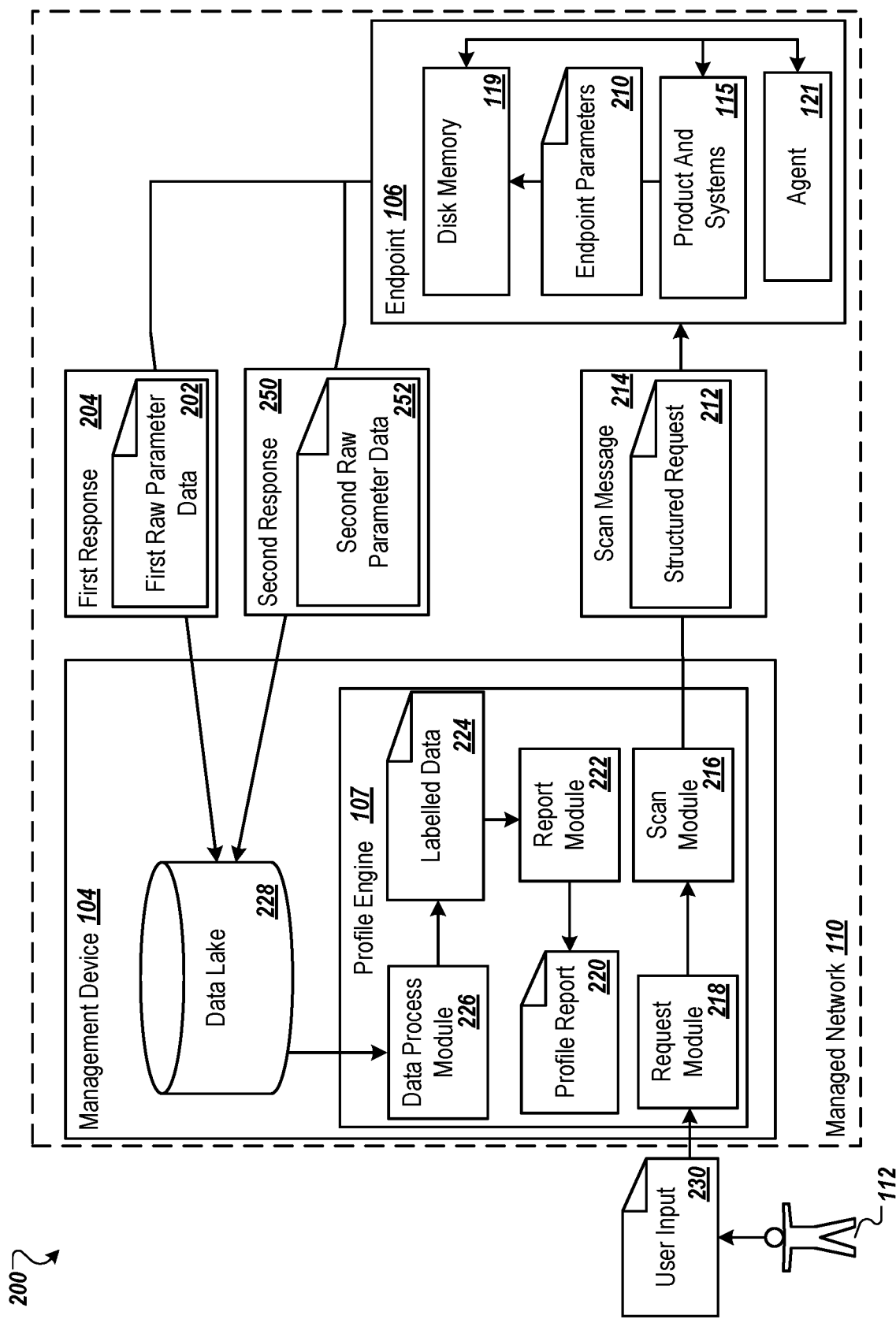
FIG. 2 depicts a block diagram of an example endpoint profiling process (profile process) that may be implemented in the operating environment of FIG. 1.

FIG. 2 depicts a block diagram of an example endpoint profiling process (profile process) 200 that may be implemented in the operating environment of FIG. 1 or another suitable environment. The profile process 200 of FIG. 2 may include one or more components (104, 106, 107, 110, 112, 115, and 119) described with reference to FIG. 1. Although not depicted in FIG. 2, communication in the profile process 200 may be via a network such as the network 108 of FIG. 1.

The embodiment of FIG. 2 depicts the management device 104 profiling the endpoint 106. In other embodiments, the profile process 200 may be implemented between the management device 104 and the cloud device 132 of FIG. 1, by the management device 104 on itself, between the cloud device 132 and the endpoint 106, etc.

The profile process 200 may begin with a request module 218 generating a structure request 212. Generation of the structured request 212 may be based at least partially on user input 230 from the administrator 112. Additionally or alternatively, the structured request 212 may be based on characteristics or attributes of the endpoint 106 or an existing or previously used structured request. For instance, the structured request 212 may have preconfigured structured requests such as "provisioning," "mini", "full", or "cloud-based" structured requests. The preconfigured structured requests may have one or more inquiries directed to particular endpoint parameters. In the examples above, the provisioning structured request may include one or more inquires directed to endpoint parameters of a particular product 115 such that the particular product 115 may be managed, set up, etc. The mini structured request may be similar to the provisioning structured request but may be for another purpose such as evaluation of use, resource allocation, etc. of one or more particular products 115. The full structured request may include inquiries directed to all or substantially all available endpoint parameters for the endpoints 106, and a cloud based structured request may include a subset of the inquiries of the full structured request. The "cloud-based" might access data stored on the cloud device or may implement the scan using some functionality of the cloud device.

Figure 3A:
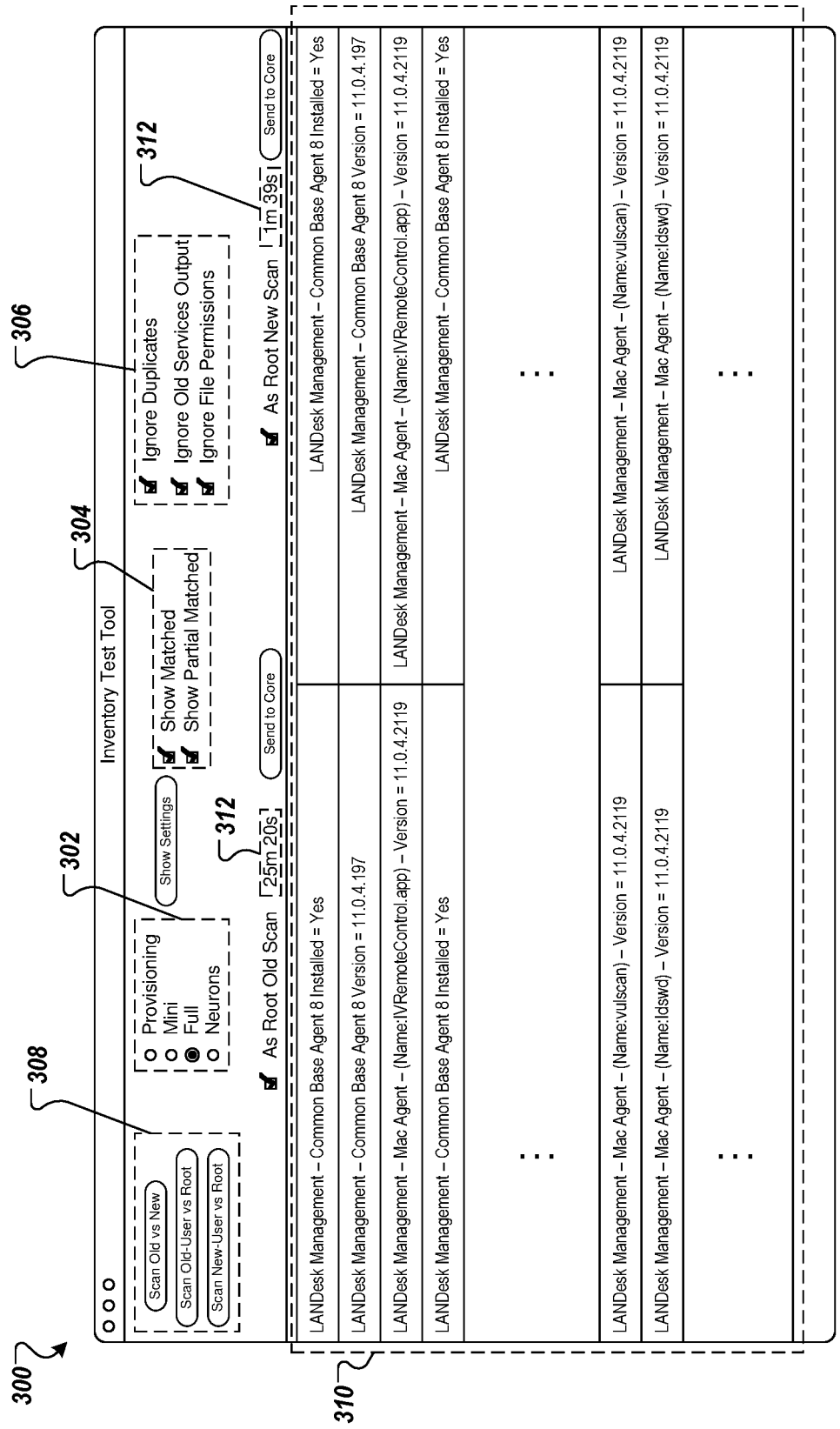
FIGS. 3A and 3B depict block diagrams of screenshots of an example comparison user interface that may be used with the profile process of FIG. 2.
Figure 3B:
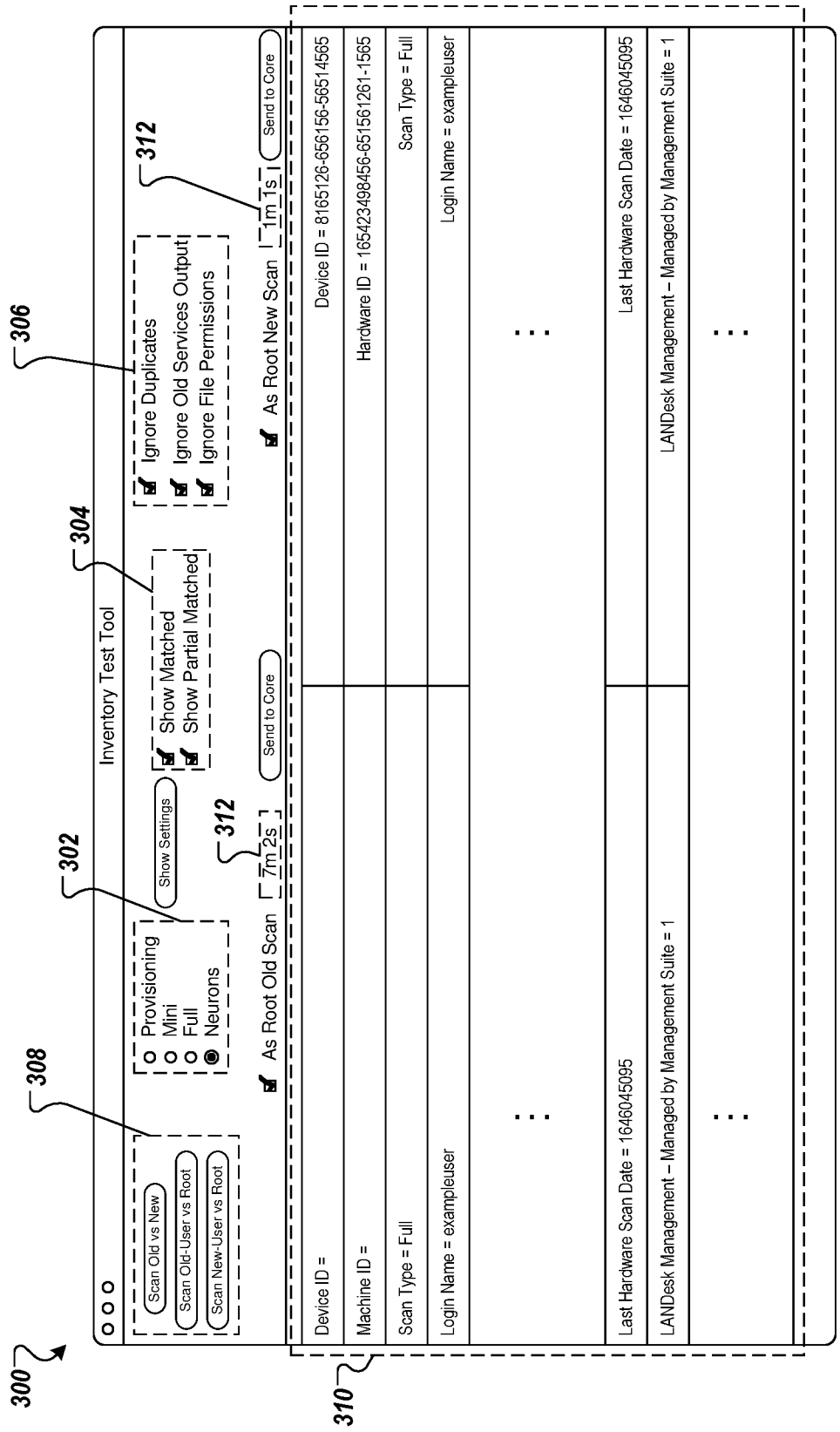

FIGS. 3A and 3B depict block diagrams of screenshots of an example comparison user interface 300 that may be used to implement the profile process 200 of FIG. 2 and compare the profile process 200 with a conventional scanning process. The user interface 300 may include scan options 302, matched option icons 304, compare option icons 308, comparison time icons 312, ignore option icons 306, and a profile window 310. The scan option icons 302 include types of structured requests that might be performed. The matched option icons 304 allow the administrator 112 to determine whether matches or partial matches are shown. The ignore option icons 306 allow the administrator 112 to ignore some data returned from the endpoint 106. The compare option icons 308 enable the administrator 112 to compare a current scan with a previous scan or a root scan. The profile window 310 provides a comparison between endpoint parameters returned between a conventional scan the profile process 200.

FIGS. 3A and 3B depict different the scan option icons 302. In the selection configuration of the user interface 300 of FIG. 3A, a selection of "Full," is made in the scan option icons 302. Accordingly, the profile window 310 displays data and information accessed from the endpoint 106 with a full structured request. In the selection configuration of the user interface 300 of FIG. 3B, a selection of "Neurons," is made. The selection of "Neurons" may indicate that a cloud-based structured request. The "Neurons" refers to IVANTI NEURONS® which is a SAAS platform for enterprise management.

In the profile window 310, endpoint parameters from the conventional scan are displayed on the left side and endpoint parameters from the profile process 200 are displayed on the right side. The endpoint parameters are substantially similar. However, the comparison time icons 312 indicate the advantage of the profile process 200 over the conventional scan.

Referring back to FIG. 2, a scan module 216 may be configured to generate a scan message 214 based on the structured request 212. The scan module 216 may evaluate the structured request and optimize it. The scan module 216 may optimize the structured request 212 to minimize communications between the management device 104 and the endpoint 106. For instance, the scan module 216 may include additional inquiries, broaden inquiries, simplify inquiries, etc. Optimization may generally include making one communication with one response.

Referring to FIG. 4, an example set 400 of inquiries is depicted. In the example set 400, a first inquiry 402 may include a first parameter name 404 and a first data type 406. Specifically, the first parameter name 404 may include a parameter name "logicalSize" that identifies the endpoint parameter and the first data type 406 of "Int," which corresponds to an integer data type. Accordingly, a scan message (214) implementing the first inquiry 402 may receive raw parameter data in the form of an integer that returns information corresponding to the logicalSize of the first inquiry 402. In addition, a second inquiry 408 may include a second parameter name 410 and a second data type 412. Specifically, the second parameter name 410 may include a parameter name "appStoreAdamID" and the data type 406 of "IntOrString," which corresponds to either an integer data type or a string data typ. Accordingly, a scan message implementing the second inquiry 408 may receive data in the form of an integer or a string that corresponds to the second inquiry 408. The set 400 refers to "Spotlight," which may indicate that the scan message relies on Spotlight as a scan feature at the endpoint.

Additionally, the set 400 may be overly inclusive. For instance, the set 400 includes a first subset 401 that is directed to a display name endpoint parameter. Instead of simply including a single inquiry directed to a displayName, the first subset 401 includes the "displayName," "displayNameWithExtensions," "alternativeNames," and "bundleIdentifier." Accordingly, raw parameter data responsive to the first subset 401 include several alternatives for the display name endpoint parameter.

Referring back to FIG. 2, the scan module 216 is configured to communicate the scan message 214 to the endpoint 106. The scan message 214 may be configured to scan for endpoint parameters 210. The scan message 214 is generally broader than the structured request 212. For instance, the scan message 214 includes the set of inquiries of the structure request 212 and at least one additional inquiry directed to an additional endpoint parameter 210.

The scan message 214 is used to access the endpoint parameters 210. For instance, the scan message 214 may be used to access the endpoint parameters 210 from the disk memory 119 on which the endpoint parameters 210 are stored at least temporarily. The scan message 214 may be implemented by a search feature of the endpoint 106 in some embodiments. Additionally or alternatively, the scan message 214 may be received by the agent 121, which accesses the endpoint parameters 210 directly, via the disk memory 119, via a search feature or some combination thereof.

Implementation of the scan message 214 may result in generation and communication of a first response 204. The first response 204 may be communicated at least partially by the endpoint 106. The first response 204 is a single response from the endpoint 106. The first response 204 includes first raw parameter data 202 responsive to inquiries of the scan message 214. For instance, the first raw parameter data 202 includes multiple data portions that may each correspond to one of the inquiries or two or more data portions that correspond to two or more inquiries. The data portions each are formatted according to a data type.

The first raw parameter data 202 may be stored at least temporarily in a data lake 228. While stored in the data lake 228, the first raw parameter data 202 may be stored and processed. In some embodiments, a data process module 226 may access the first raw parameter data 202 and process it. For instance, with combined reference to FIGS. 2, 4, and 5. The second inquiry 408 includes the second data type 412 of "IntOrString," Accordingly, the first raw parameter data 202 might include a first portion of the first raw parameter data 202 that is a string data type or an integer data type. The data process module 226 may be configured to convert the first portion of the first raw parameter data 202 from the string data type to an integer data type or vice versa. The conversion may be based on the processing performed on the first data portion.

FIG. 5 is a portion of an example processing algorithm 500 that may be implemented to address the first data portion having the IntOrString data type. In general, the processing algorithm 500 attempts to decode the raw parameter data as an integer. In response to a failure to decode the raw parameter data as the integer, the processing algorithm 500 decodes the first raw parameter data as the string. The processing algorithm 500 is provided as an example processing algorithm that may be implemented. In other embodiments other flexible data type inquiries may be implemented to convert between other types of data types.

Referring back to FIG. 2, the data process module 226 may be configured to extract metadata from the first raw parameter data 202 and label portions thereof. For instance, the first raw parameter data 202 may includes some metadata that is included when it is stored on the disk memory 119 or accessed by the search feature, for instance.

The data process module 226 may label the data portions of the first raw parameter data 202. The data process module 226 may label the data portions using to the parameter name of the structured request 212 and/or the extracted metadata. In some embodiments, to process the first raw parameter data, the data process module 226 may generate a dictionary using MDItem functions. The data process module 226 may then modify the dictionary into a plist data blob. The data process module 226 may then obtain data for the labels using a decoder to obtain data for the labels. An example of an algorithm to process the first raw parameter data 202 is provide in FIG. 6. Additionally, the data process module 226 may create a correlation between the parameter names, the metadata, and particular data portions of the first raw parameter data 202 using a mapping table. An example of a mapping table that may be implemented in the profile process 200 is provided in FIG. 7. In the embodiment of FIG. 2, the data type conversion occurs prior to the labeling. In other embodiments, some portion of the labelling may occur following labelling.

The report module 222 may generate a profile report 220 of the endpoint 106. The profile report 220 of the endpoint 106 is derived from the labelled data 224. The report module 222 may pull data portions from the data lake 228 that correspond to the inquires or the parameter names thereof. For instance, the first raw parameter data 202 may include more information than that sought by the structured request.

The report module 222 uses the labels and the parameter names to pull only the information from the data lake 228 that is requested in the inquiries of the structured request 212. The profile report 220 may be provided to the administrator 112 via the management device 104. In some embodiments, the data process module 226 may convert the labelled data to a human-readable format such that the profile report 220 includes the parsed data in the human-readable format.

An example of the profile report 220 is depicted in FIGS. 8A-8D. In the profile report 220 parsed and labelled data is listed along with identifying information that identifies the endpoint 106. For instance, in FIG. 8A an example of identifying information 802 is depicted. Following the identifying information 802 the profile report 220 includes a list of devices, which is substantially similar to or an example of the products 115 of FIGS. 1 and 2. Some examples of the products of the profile report 220 includes the "Manufacturer," Security—AntiVirus Software—(Number:0)," "processor" etc. With each of the products are one or more pieces of information and corresponding data related to the product. For instance, the profile report 220 includes information and data relative to the "processor:"

Processor—Type=6-Core Source-4 Core k5
Processor—Speed=2.6 GHz
Processor—Processor Count=1
Processor—Features—Cores per Package=6 processor The profile report 220 includes multiple additional products, information and data including drivers and services, company management components (on FIG. 8B), network—TCPIP (on FIG. 8C), printers (on FIG. 8C), mass storage (on FIG. 8D), ports (on FIG. 8D), products (on FIG. 8D), software-drivers and plug-ins (on FIG. 8D), etc.

With reference to FIGS. 2 and 4, in the depicted embodiment, the structured request 212 and/or the scan message 214 may be used at a later time to generate an updated version of the profile report 220. The scan message 214 may be communicated again to the endpoint 106. Implementation of the scan message 214 results in the second response 250 including second raw parameter data 252. The second raw parameter data 252 may be processes as described with reference to the first raw parameter data 202.

A first data portion corresponding to the second inquiry 408 of FIG. 4 may include different between the first response 204 and the second response 250. For instance, in the first raw parameter data 202 the first portion may have been a string. In the second raw parameter data 252, the first portion may be an integer. Because the second data type 412 IntOrString is the data type associated with the second inquiry 408, the change from the string to the integer may be acceptable and processable by the data process module 226. In particular, the data process module 226 may either accept the first data portion or convert it using the algorithm 500 of FIG. 5 or a similar conversion algorithm.

Figure 9:
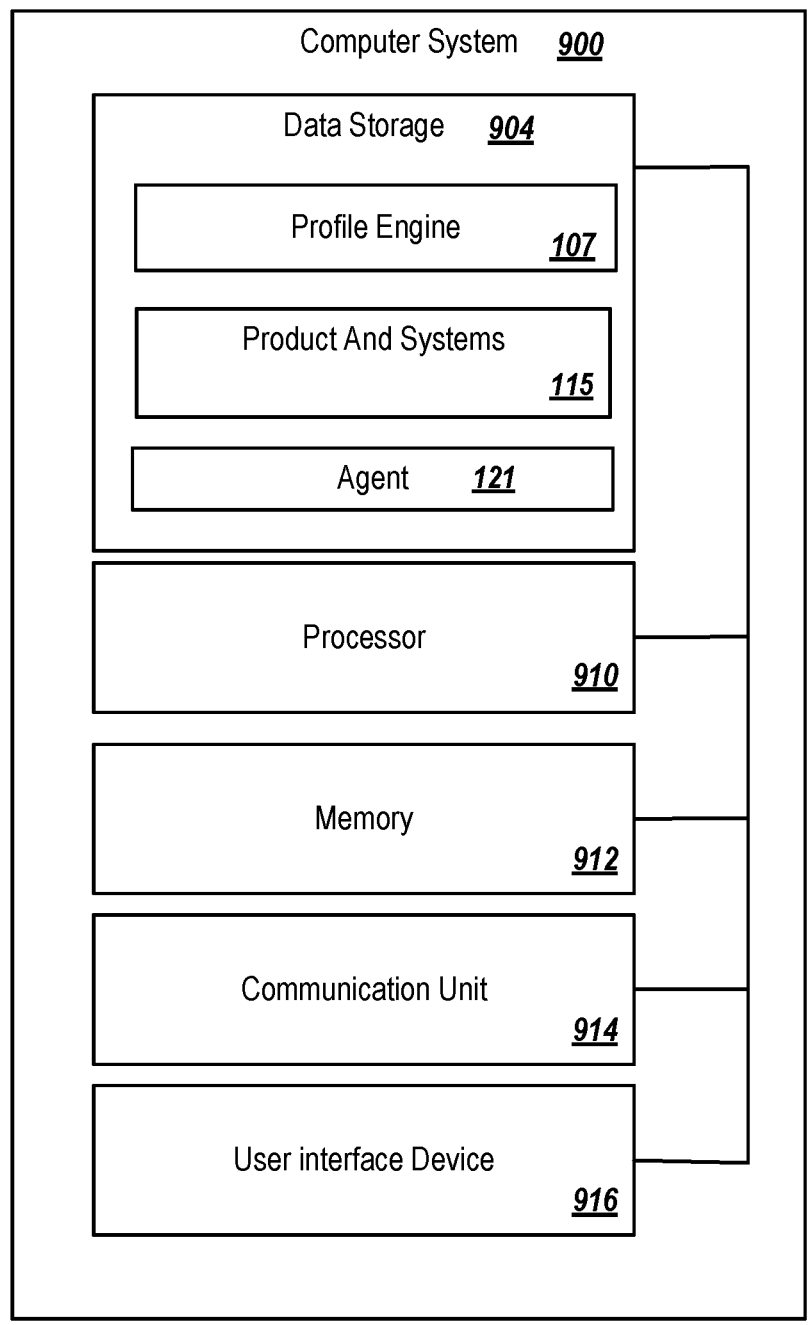
FIG. 9 illustrates an example computer system configured for endpoint profiling.

FIG. 9 illustrates an example computer system 900 configured for endpoint profiling, according to at least one embodiment of the present disclosure. The computer system 900 may be implemented in the operating environment 100 of FIG. 1, for instance. Examples of the computer system 900 may include the management device 104, one or more of the endpoints 106, the cloud device 132, or some combination thereof. The computer system 900 may include one or more processors 910, a memory 912, a communication unit 914, a user interface device 916, and a data storage 904 that includes the profile engine 107, the agent 121, and the products 115 (collectively, modules 107/115/121).

The processor 910 may include any suitable special-purpose or general-purpose computer, computing entity, or processing device including various computer hardware or software modules and may be configured to execute instructions stored on any applicable computer-readable storage media. For example, the processor 910 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 9, the processor 910 may more generally include any number of processors configured to perform individually or collectively any number of operations described in the present disclosure. Additionally, one or more of the processors 910 may be present on one or more different electronic devices or computing systems. In some embodiments, the processor 910 may interpret and/or execute program instructions and/or process data stored in the memory 912, the data storage 904, or the memory 912 and the data storage 904. In some embodiments, the processor 910 may fetch program instructions from the data storage 904 and load the program instructions in the memory 912. After the program instructions are loaded into the memory 912, the processor 910 may execute the program instructions.

The memory 912 and the data storage 904 may include computer-readable storage media for carrying or having computer-executable instructions or data structures stored thereon. Such computer-readable storage media may include any available media that may be accessed by a general-purpose or special-purpose computer, such as the processor 910. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 910 to perform a certain operation or group of operations.

The communication unit 914 may include one or more pieces of hardware configured to receive and send communications. In some embodiments, the communication unit 914 may include one or more of an antenna, a wired port, and modulation/demodulation hardware, among other communication hardware devices. In particular, the communication unit 914 may be configured to receive a communication from outside the computer system 900 and to present the communication to the processor 910 or to send a communication from the processor 910 to another device or network (e.g., the network 108 of FIG. 1).

The user interface device 916 may include one or more pieces of hardware configured to receive input from and/or provide output to a user. In some embodiments, the user interface device 916 may include one or more of a speaker, a microphone, a display, a keyboard, a touch screen, or a holographic projection, among other hardware devices.

The modules 107/115/121 may include program instructions stored in the data storage 904. The processor 910 may be configured to load the modules 107/115/121 into the memory 912 and execute the modules 107/115/121. Alternatively, the processor 910 may execute the modules 107/115/121 line-by-line from the data storage 904 without loading them into the memory 912. When executing the modules 107/115/121, the processor 910 may be configured to perform one or more processes or operations described elsewhere in this disclosure.

Modifications, additions, or omissions may be made to the computer system 900 without departing from the scope of the present disclosure. For example, in some embodiments, the computer system 900 may not include the user interface device 916. In some embodiments, the different components of the computer system 900 may be physically separate and may be communicatively coupled via any suitable mechanism. For example, the data storage 904 may be part of a storage device that is separate from a device, which includes the processor 910, the memory 912, and the communication unit 914, that is communicatively coupled to the storage device. The embodiments described herein may include the use of a special-purpose or general-purpose computer including various computer hardware or software modules, as discussed in greater detail below.

Figure 10:
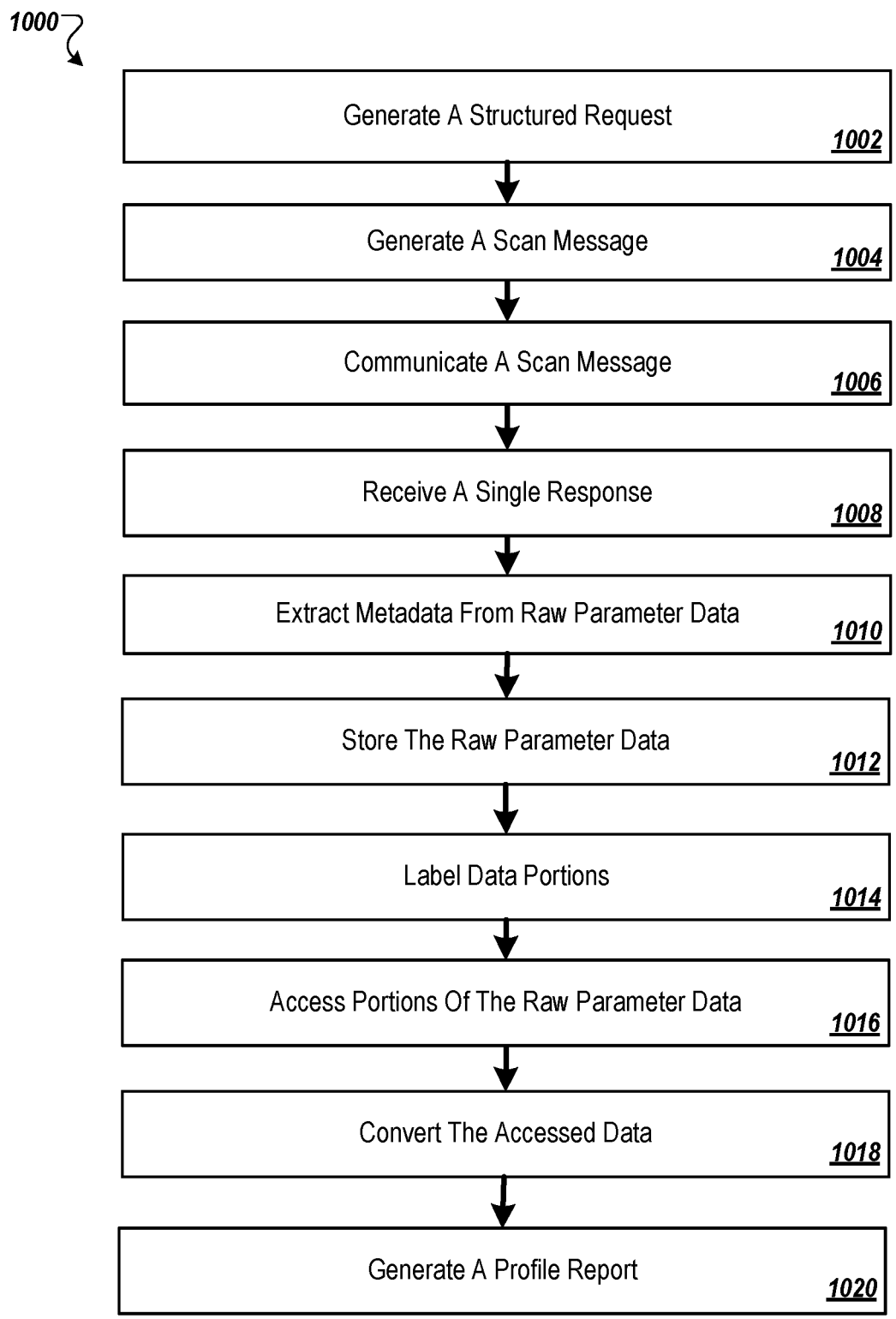
FIG. 10 is a flow chart of an example method of profiling an endpoint, all according to at least one embodiment described in the present disclosure.

FIG. 10 is a flow chart of an example method 1000 of profiling an endpoint, according to at least one embodiment of the present disclosure. The method 1000 may be performed in a suitable operating environment such as the operating environment 100 or the managed network 110 of FIG. 1.

The method 1000 may begin at block 1002 in which a structured request may be generated. the structured request may be directed to an endpoint. The structured request may include a set of inquiries. One or more of the inquiries of the set of inquiries is directed to an endpoint parameter. In some embodiments, the set of inquiries of the structured request is pre-defined. For instance, the set of inquiries might be a "full" set of inquiries that is directed to most or all of the endpoint parameters, a "partial" set of inquiries that is directed to a subset of all endpoint parameters, etc.

Additionally or alternatively, in some embodiments, one or more of the inquiries may include a parameter name and/or an anticipated data type. The anticipated data type associated with the one or more inquiries describes the data type of data responsive to the inquiry. For instance, the anticipated data type might include integer, string, Boolean, etc. In some embodiments, the anticipated data type might include an integer-or-string data type, which is configured to enable data portions of raw parameter data responsive to a particular inquiry to be either an integer data type or a string data type.

At block 1004, a scan message may be generated. The scan message may include the set of inquiries and at least one additional inquiry directed to an additional endpoint parameter. For instance, the scan message may be generated to optimize the collection at the endpoint. For instance; the endpoint might include a particular data structure or include information related in a particular structure at the endpoint. Accordingly, the scan message might collect an overly inclusive amount of information to ensure information related to the inquiries is collected.

In some embodiments, the scan message identifies one or both of the scan message is directed to an agent at the endpoint. In these embodiments, the agent may be received and execute the scan message. Additionally, in some embodiments, the scan message may include a disk memory location of the endpoint on which the endpoint parameters and the additional endpoint parameter are accessible and/or an application database of the endpoint on which the endpoint parameters and the additional endpoint parameter are accessible.

The scan message may be a single scan message sent to the endpoint to collect endpoint parameters. For instance, to generate an endpoint profile at a particular time, instead of multiple scan messages communicated to the endpoint directed to a subset of the endpoint parameters, the scan message may be a single message communicated to the endpoint to generate the endpoint profile. At block 1006, the scan message may be communicated to the endpoint.

At block 1008, a single response may be received from the endpoint. The single response may include raw parameter data, which may be responsive to the inquiries of the set of inquiries as well as the additional inquiry. The raw parameter data includes multiple data portions having associated therewith metadata. For instance, the raw parameter data may include metadata from the endpoint indicating data structure and component associate with the data portion. The raw parameter data represents a pre-collection of data related to the endpoint. For instance, the raw parameter data includes at least one data portion in addition to data related to the endpoint parameters of the structured request.

In some embodiments, the set of inquiries includes a first inquiry that has associated therewith the anticipated data type of integer-or-string data type. A first data portion might correspond to (e.g., include information responsive to) the first inquiry. The first data portion of the raw parameter data may include the integer data type. Accordingly, the method 1000 may further comprise converting the first data portion from the integer data type to a string data type. The data type conversion may include attempting to decode the first data portion as an integer data type and in response to a failure to decode the first data portion as the integer data type, decoding the first data portion as the string data type. In some embodiments, the converting of the data type might occur prior to the labeling. The multiple-data type such as the integer-or-string data type may enable the same scan message or the same inquiry to be used at different times and with different types of endpoints. For instance, the scan message is communicated a first time, which may result in the first data portion having an integer data type. At a second time, the scan message may be communicated to the endpoint, which may result in the first data portion having a string data type, which may be converted. Similarly, the scan message may be communicated to multiple endpoints that might communicate the first data portion that might be either the integer type or the string type.

At block 1010, the metadata may be extracted from the raw parameter data. For instance, the raw parameter data may be parsed to enable identification of the metadata associated with each of the data portions. This may provide a loose organization of the raw parameter data. At block 1012, the raw parameter data may be stored. The raw parameter data may be stored in a data lake or another suitable storage structure. In the data lake, the raw parameter data may be organized according to the extracted metadata. In some embodiments, the data lake is local and the raw parameter data is locally stored. For instance, in embodiments implemented by the management device 104 of FIG. 1, the data lake may be stored at the management device 104 or in a data lake that is accessible to the management device 104, but remote to the endpoint 106.

At block 1014, one or more data portions of the raw parameter data may be labelled. For instance, the data portions may be labeled using the parameter name of the structured request, the metadata of the raw parameter data, and the like. In some embodiments, the labeling may include correlating the extracted metadata of particular data portions of the raw parameter data to the endpoint parameters using a mapping table. In some embodiments, the labelling of the data portions may include generating a dictionary using MDItem functions. The generated dictionary may be modified into a plist data blob. Data for the labels may be obtained using a decoder function. At block 1016, portions of the raw parameter data may be accessed. For instance, the portions of the raw parameter data may be accessed from the data lake responsive to the set of inquiries based on labels associated with each data portion. Accordingly, the metadata may be correlated to the parameter names and labelled. The portions of the raw parameter data that correspond to the inquiries may be accessed from the data lake.

At block 1018, the accessed data may be converted to a human-readable format. The accessed data may be converted to a human-readable format such that the profile report includes the accessed data in the human-readable format. At block 1020, a profile report may be generated. The profile report may be derived from the accessed data and/or the converted data.

The method 1000 may be performed by the management device 104 described elsewhere in the present disclosure or by another suitable computing system, such as the computer system 900 of FIG. 9. In some embodiments, the management device 104 or the other computing system may include or may be communicatively coupled to a non-transitory computer-readable medium (e.g., the memory 912 of FIG. 9) having stored thereon programming code or instructions that are executable by one or more processors (such as the processor 910 of FIG. 9) to cause a computing system or the management device 104 to perform or control performance of the method 1000. Additionally or alternatively, the management device 104 may include the processor 910 that is configured to execute computer instructions to cause the management device 104 or other computing systems to perform or control performance of the method 1000. The management device 104 or the computer system 900 implementing the method 1000 may be included in a cloud-based managed network, an on-premises system, or another suitable network computing environment. Although illustrated as discrete blocks, one or more blocks in FIG. 10 may be divided into additional blocks, combined into fewer blocks, or eliminated, depending on the desired implementation.

Further, modifications, additions, or omissions may be made to the method 1000 without departing from the scope of the present disclosure. For example, the operations of method 1000 may be implemented in differing order. Furthermore, the outlined operations and actions are only provided as examples, and some of the operations and actions may be optional, combined into fewer operations and actions, or expanded into additional operations and actions without detracting from the disclosed embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of profiling an endpoint, the method comprising:
   generating a structured request directed to an endpoint, the structured request including a set of inquiries in which each inquiry of the set of inquiries is directed to an endpoint parameter and includes both a parameter name and an anticipated data type of the endpoint parameter;
   generating a scan message, the scan message including the set of inquiries and at least one additional inquiry directed to an additional endpoint parameter, wherein the additional inquiry includes both a parameter name and an anticipated data type of the additional endpoint parameter;
   communicating the scan message to the endpoint;
   receiving a single response from the endpoint, the single response including raw parameter data responsive to each inquiry of the set of inquiries and the additional inquiry, wherein the raw parameter data includes a plurality of data portions and metadata associated with each data portion of the plurality of data portions, and wherein each data portion corresponds to one of the inquiries and is formatted according to a data type;
   parsing the raw parameter data to identify the metadata associated with each data portion;
   extracting the identified metadata associated with each data portion from the raw parameter data;
   storing the raw parameter data in a data lake organized according to the extracted metadata;
   labeling each data portions of the plurality of data portions using the parameter name of the structured request and the extracted metadata associated with each data portion;
   accessing, from the data lake, portions of the raw parameter data responsive to the set of inquiries based on labels associated with each data portion; and
   generating a profile report of the endpoint derived from the accessed portions of the raw parameter data.

2. The method of claim 1, wherein:
   the anticipated data type associated with a first inquiry of the set of inquiries includes an integer-or-string data type, wherein the integer-or-string data type enables a first data type of a first data portion that is responsive to the first inquiry to be formatted according to either an integer data type or a string data type.

3. The method of claim 2, further comprising:
   attempting to decode the first data portion as an integer data type; and
   in response to a failure to decode the first data portion as the integer data type, decoding the first data portion as the string data type.

4. The method of claim 2, wherein:
   the scan message is communicated at a first time;
   the raw parameter data is first raw parameter data;
   the single response is a first single response received in response to the scan message communicated at the first time; and
   the first data portion of the raw parameter data responsive to the scan message is formatted according to an integer data type,
   the method further comprising:
      further communicating the scan message to the endpoint at a second time that is after the first time;
      receiving a second single response responsive to the communication of the scan message at the second time, wherein the second single response includes second raw parameter data, and the first data portion of the second raw parameter data is formatted according to a string data type; and
      converting the first data portion from the string data type to the integer data type.

5. The method of claim 2, wherein:
   the endpoint is a first endpoint of a first type;
   the raw parameter data is a first raw parameter data received from the first endpoint;
   the method further comprises communicating the scan message to a second endpoint, to collect second raw parameter data from the second endpoint;
   a first data portion of the first raw parameter data is formatted according to a string data type; and
   a first data portion of the second raw parameter data is formatted according to an integer data type.

6. The method of claim 1, further comprising converting the accessed data to a human-readable format such that the profile report includes the accessed data in the human-readable format.

7. The method of claim 1, further comprising:
generating a dictionary using MDitem functions;
modifying the dictionary into a plist data blob; and
obtaining data for the labels using a decoder.

8. The method of claim 1, wherein:
the raw parameter data represents a pre-collection of data related to the endpoint; and
the raw parameter data includes at least one data portion in addition to the data related to the endpoint parameter of the structured request and the additional endpoint parameter of the additional inquiry.

9. The method of claim 1, wherein:
the scan message is a single scan message sent to the endpoint to collect endpoint parameters;
the data lake is local and the raw parameter data is locally stored;
the set of inquiries of the structured request is pre-defined;
the scan message is directed to an agent at the endpoint;
the labeling includes correlating the extracted metadata of particular data portions of the raw parameter data to the endpoint parameters using a mapping table; and
the scan message identifies one or both of:
a disk memory location of the endpoint on which the endpoint parameters and the additional endpoint parameter are accessible; and
an application database of the endpoint on which the endpoint parameters and the additional endpoint parameter are accessible.

10. One or more non-transitory computer-readable media having encoded therein programming code executable by one or more processors to perform or control performance of operations of profiling an endpoint, the operations comprising:
generating a structured request directed to an endpoint, the structured request including a set of inquiries in which each inquiry of the set of inquiries is directed to an endpoint parameter and includes both a parameter name and an anticipated data type of the endpoint parameter;
generating a scan message, the scan message including the set of inquiries and at least one additional inquiry directed to an additional endpoint parameter, wherein the additional inquiry includes both a parameter name and an anticipated data type of the additional endpoint parameter;
communicating the scan message to the endpoint;
receiving a single response from the endpoint, the single response including raw parameter data responsive to each inquiry of the set of inquiries and the additional inquiry, wherein the raw parameter data includes a plurality of data portions and metadata associated with each data portion of the plurality of data portions, and wherein each data portion corresponds to one of the inquiries and is formatted according to a data type;
parsing the raw parameter data to identify the metadata associated with each data portion;
extracting the identified metadata associated with each data portion from the raw parameter data;
storing the raw parameter data in a data lake organized according to the extracted metadata;
labeling each data portions of the plurality of data portions using the parameter name of the structured request and the extracted metadata associated with each data portion;
accessing, from the data lake, portions of the raw parameter data responsive to the set of inquiries based on labels associated with each data portion; and
generating a profile report of the endpoint derived from the accessed portions of the raw parameter data.

11. The one or more non-transitory computer-readable media of claim 10, wherein:
the anticipated data type associated with a first inquiry of the set of inquiries includes an integer-or-string data type, wherein the integer-or-string data type enables a first data type of a first data portion that is responsive to the first inquiry to be formatted according to either an integer data type or a string data type.

12. The one or more non-transitory computer-readable media of claim 11, further comprising:
attempting to decode the first data portion as an integer data type; and
in response to a failure to decode the first data portion as the integer data type, decoding the first data portion as the string data type.

13. The one or more non-transitory computer-readable media of claim 11, wherein:
the scan message is communicated at a first time;
the raw parameter data is first raw parameter data;
the single response is a first single response received in response to the scan message communicated at the first time;
the first data portion of the raw parameter data responsive to the scan message is formatted according to an integer data type; and
the operations further comprise:
further communicating the scan message to the endpoint at a second time that is after the first time;
receiving a second single response responsive to the communication of the scan message at the second time, wherein the second single response includes second raw parameter data, and the first data portion of the second raw parameter data is formatted according to a string data type; and
converting the first data portion from the string data type to the integer data type.

14. The one or more non-transitory computer-readable media of claim 11, wherein:
the endpoint is a first endpoint of a first type;
the raw parameter data is a first raw parameter data received from the first endpoint;
the operations further comprise communicating the scan message to a second endpoint, to collect second raw parameter data from the second endpoint;
a first data portion of the first raw parameter data is formatted according to a string data type; and
a first data portion of the second raw parameter data is formatted according to an integer data type.

15. The one or more non-transitory computer-readable media of claim 10, wherein the operations further comprise converting the accessed data to a human-readable format such that the profile report includes the accessed data in the human-readable format.

16. The one or more non-transitory computer-readable media of claim 10, wherein the operations further comprise:
generating a dictionary using MDitem functions; modifying the dictionary into a plist data blob; and
obtaining data for the labels using a decoder.

17. The one or more non-transitory computer-readable media of claim 10, wherein:
- the raw parameter data represents a pre-collection of data related to the endpoint; and
- the raw parameter data includes at least one data portion in addition to the data related to the endpoint parameter of the structured request and the additional endpoint parameter of the additional inquiry.

18. The one or more non-transitory computer-readable media of claim 10, wherein:
- the scan message is a single scan message sent to the endpoint to collect endpoint parameters;
- the data lake is local and the raw parameter data is locally stored; the set of inquiries of the structured request is pre-defined;
- the scan message is directed to an agent at the endpoint;
- the labeling includes correlating the extracted metadata of particular data portions of the raw parameter data to the endpoint parameters using a mapping table; and
- the scan message identifies one or both of:
    - a disk memory location of the endpoint on which the endpoint parameters and the additional endpoint parameter are accessible; and
    - an application database of the endpoint on which the endpoint parameters and the additional endpoint parameter are accessible.

* * * * *